United States Patent
Zander

(10) Patent No.: US 10,688,925 B2
(45) Date of Patent: Jun. 23, 2020

(54) LIGHTING DEVICE FOR ILLUMINATING A PASSENGER COMPARTMENT OF A VEHICLE

(71) Applicant: Volkswagen Aktiengesellschaft, Wolfsburg (DE)

(72) Inventor: Klaus Zander, Hoetensleben (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/375,216

(22) Filed: Apr. 4, 2019

(65) Prior Publication Data

US 2019/0308553 A1   Oct. 10, 2019

(30) Foreign Application Priority Data

Apr. 4, 2018   (DE) .......... 10 2018 205 059

(51) Int. Cl.
| | |
|---|---|
| *B60Q 3/00* | (2017.01) |
| *B60Q 3/74* | (2017.01) |
| *B60Q 3/64* | (2017.01) |
| *B60Q 3/76* | (2017.01) |
| *B60Q 3/82* | (2017.01) |
| *F21V 8/00* | (2006.01) |
| *F21V 23/04* | (2006.01) |

(52) U.S. Cl.
CPC ............. *B60Q 3/74* (2017.02); *B60Q 3/64* (2017.02); *B60Q 3/76* (2017.02); *B60Q 3/82* (2017.02); *F21V 23/0485* (2013.01); *G02B 6/006* (2013.01)

(58) Field of Classification Search
CPC ...................................................... B60Q 3/82
See application file for complete search history.

(56) References Cited

U.S. PATENT DOCUMENTS

| | | | |
|---|---|---|---|
| 5,239,152 A | 8/1993 | Caldwell et al. | |
| 7,507,929 B2 | 3/2009 | Streifler | |
| 8,890,839 B2 | 11/2014 | Santarossa | |
| 9,235,306 B2 | 1/2016 | Lubert et al. | |
| 2009/0251917 A1 | 10/2009 | Wollner et al. | |
| 2010/0238677 A1 | 9/2010 | de Laine et al. | |
| 2014/0226303 A1* | 8/2014 | Pasdar | B60Q 3/82 362/23.08 |

(Continued)

FOREIGN PATENT DOCUMENTS

| | | |
|---|---|---|
| DE | 19537168 A1 | 4/1996 |
| DE | 10326684 A1 | 12/2004 |

(Continued)

*Primary Examiner* — Andrew J Coughlin
(74) *Attorney, Agent, or Firm* — Muncy, Geissler, Olds & Lowe, P.C.

(57) ABSTRACT

A lighting device for illuminating a passenger compartment of a vehicle, having a primary light source, a light directing element, and a lens sealing the lighting device with respect to the passenger compartment of the vehicle, is distinguished in that a light guiding element is arranged between the primary light source and the lens, which element has irregularities that are arranged in a predetermined shape, in that a secondary light source is arranged such that light emitted by the secondary light source is coupled into the light guiding element, and in that the lens is designed to be touch-sensitive and/or proximity-sensitive.

15 Claims, 1 Drawing Sheet

(56) References Cited

U.S. PATENT DOCUMENTS

2015/0199041 A1\* 7/2015 Salter .................. B60Q 3/14
345/174

FOREIGN PATENT DOCUMENTS

| DE | 102009001412 A1 | 9/2010 |
| DE | 102009037104 A1 | 2/2011 |
| DE | 102009060355 A1 | 6/2011 |
| DE | 102010013947 A1 | 10/2011 |
| DE | 102011077896 A1 | 12/2012 |
| DE | 102013012228 A1 | 1/2015 |
| DE | 102013018989 A1 | 5/2015 |
| DE | 10 2014 217 200 A1 | 3/2016 |
| EP | 3 407 369 A1 | 11/2018 |
| FR | 3 010 484 A1 | 3/2015 |
| JP | 20044327069 A | 11/2004 |
| JP | 2012-045992 A | 3/2012 |
| JP | 2014133559 A | 7/2014 |

\* cited by examiner

LIGHTING DEVICE FOR ILLUMINATING A PASSENGER COMPARTMENT OF A VEHICLE

This nonprovisional application claims priority under 35 U.S.C. § 119(a) to German Patent Application No. 10 2018 205 059.7, which was filed in Germany on Apr. 4, 2018, and which is herein incorporated by reference.

BACKGROUND OF THE INVENTION

Field of the Invention

The present invention relates to a lighting device for illuminating a passenger compartment of a vehicle, having a primary light source, a light directing element, and a lens sealing the lighting device with respect to the passenger compartment of the vehicle. In addition, the invention relates to a vehicle with such a lighting device.

Description of the Background Art

Corresponding lighting devices have been known for a long time, and are present in virtually every motor vehicle. These are lighting devices in the form of reading lamps or lamps for illuminating the passenger compartment during entry and exit. These lamps are normally operated in this case by mechanical switches delimited from the lamp that are located in the vicinity of the lamp. In this context, small additional lights are often integrated into these switches, which serve as so-called switch locating lights and often represent small pictograms to illustrate the function of the switch.

Mechanical switches are increasingly being replaced of late in that the function of the relevant switch is integrated into surfaces designed to be touch-sensitive. Because touch-sensitive displays have found widespread use in recent years in the form of smartphones, tablets, and even in motor vehicles, users have become accustomed to this method of control in the meantime. Touch-sensitive surfaces permit an attractive design that is not disrupted by a multiplicity of busy-looking, individual mechanical switches, but instead allows for large, flat areas.

In the course of this development, initial embodiments already exist in which lamps in the passenger compartment of the vehicle can be operated by touch-sensitive surfaces. One particular version of such a lamp uses the outer surface of the lamp, the so-called lens, as a touch-sensitive element. In this way a very unobtrusive lamp can be designed that allows for a harmonious and elegant design of the vehicle passenger compartment. However, such a design of the lamp entails disadvantages in usability, since the symbols previously depicted on the relevant switches are absent, so that in some cases a user cannot identify which function is performed by the lamp he has switched on, or which one of several available lamps is the one that matches the present need of the user. For example, a reading lamp may be located in the vicinity of an overall passenger compartment light. If the user is not familiar with the vehicle and its operation, and/or if the position of the lamps does not make it immediately obvious which lamp has which function, confusion and increased effort in operating the lamps may occur.

It is known to use a narrow ring, luminous in color if applicable, arranged around the lamp to identify a light that can be controlled by means of a touch-sensitive surface. This method of identification also has the disadvantage discussed above that it is not immediately clear what purpose the relevant lamp serves.

Moreover, various possibilities are known for providing a switch with an illuminated symbol for identification. Thus, for example, DE 10 2013 018 989 A1 describes a touch-sensitive switch that includes a cover with a touch-sensitive surface and at least one graphic symbol. Located behind the cover is a support plate on which at least one capacitive sensor element for detecting touching of the touch-sensitive surface is located. In addition, the touch-sensitive surface is backlit to make the graphic symbol visible. The support plate here is opaque and has a multiplicity of through-openings through which the touch-sensitive surface or the graphic symbol can be illuminated.

From DE 10 2009 001 412 A1, a capacitive display and operating element is known that is designed to be proximity-sensitive or touch-sensitive, wherein a lamp is located on the rear side of the element and extends through it to the front, and wherein the lamp is driven as a function of an operating action of a user.

DE 103 26 684 A1, which corresponds to U.S. Pat. No. 7,507,929, discloses a sensor device for generating a switching signal upon approach and/or touch, which includes a capacitive sensor element, wherein the touch sensitivity is achieved through printing or coating with a conductive material. The printing or coating in this case is intended to be essentially transparent so that illumination of the switch from behind is possible. Similarly, the printing or coating can have a symbol shape so that labeling of the switch is possible.

SUMMARY OF THE INVENTION

It is therefore an object of the present invention to provide a lighting device for the passenger compartment of a motor vehicle that blends in with the passenger compartment in a visually harmonious manner and is simple and reliable to operate.

In an exemplary embodiment of the invention a light guiding element is arranged between the primary light source and the lens, which element has irregularities that are arranged in a predetermined shape, in that a secondary light source is arranged such that light emitted by the secondary light source is coupled into the light guiding element, and in that the lens is designed to be touch-sensitive and/or proximity-sensitive. The expression "between the primary light source and the lens" in this context relates in particular to a direction parallel to the primary direction of propagation of the light emitted by the primary light source. This direction in turn corresponds to a direction that extends from the primary light source all the way through the lens, in particular through a geometric centroid of the lens, toward the interior of the passenger compartment.

The primary light source here can correspond to the actual lamp and is responsible for lighting of the passenger compartment. It can be implemented as an LED. The lamp also includes a light guiding element, which can be implemented as a reflector and/or as a collimator. The lamp is delimited toward the passenger compartment by a so-called lens, which is to say a transparent cover lens. The light emitted by the primary light source reaches the passenger compartment from this cover lens. The cover lens or lens is perceived by the user as a luminous surface. The primary light source is connected to a control unit that activates the lamp and, if applicable, controls the luminous intensity. In the simplest case, this can be a simple switch, but more complex control units are also possible, for example that take into account sensor data from an ambient light sensor, more complex input from a user, or data on the occupancy of the vehicle by passengers. Up to this point, the construction of the lighting device according to the invention corresponds to a conventional lighting device.

The secondary light source can be used to provide the lamp with an identification, in particular in the switched-off state. To this end, the light from the secondary light source is coupled into the light guiding element, which can be flat in design. Arranged within the light guiding element are irregularities that are suitable for scattering the coupled-in light out of the light guiding element. The irregularities can be located directly at the surface of the light guiding element or deeper within the volume of the light guiding element. The irregularities are arranged relative to one another such that, taken together, they result in a predetermined shape. This shape preferably is oriented such that it extends parallel to the lens or to its outer surface facing the passenger compartment. The component of the light from the secondary light source that is scattered by the irregularities toward the lens can be perceived by a user in the predetermined shape on the lens and can be used for identification of the lamp.

In a useful implementation of the invention, provision is made that the predetermined shape represents a pictogram. Simple and effective identification of the individual lamps is possible in this way. The irregularities introduced into the light guiding element can be formed of points, of lines, and/or of areas. The light coupled into the light guiding element is scattered at the irregularities and deflected toward the viewer. For this purpose, the light from the secondary light source can be coupled laterally into the light guiding element. Light that does not strike any irregularities thus passes through the light guiding element essentially perpendicularly to the light emitted by the primary light source, and therefore does not emerge from the lamp. In this way, a very unobtrusive identification of the lamp is produced by the illumination of the predetermined pattern or symbol or pictogram.

The light guiding element can be essentially parallel to the lens. The result is thus a symmetrical design and consequently a homogeneous representation of the identification of the lamp. An "essentially" parallel or perpendicular orientation of two directions relative to one another is understood here to mean, in particular, that the directions are parallel or perpendicular to one another, or form a small angle with one another of no more than 10°. In a special case, the two directions are exactly parallel or perpendicular to one another.

Embodiments in which the light guiding element forms an angle with the lens of more than 10°, for example more than 20°, or even more than 30°, are of course likewise possible. In every case it is advantageous if the light guiding element has the shape of a plane-parallel plate, since the light from the primary light source can then pass through the light guiding element largely unaffected.

A cross-section of the lens viewed in a direction of propagation of the light emitted by the primary light source can be larger than a corresponding cross-section of the light guiding element. In this way, it becomes possible to emit light over a relatively large area into the passenger compartment of the vehicle, even from small, nearly point light sources, so that a glare effect for the user is avoided or at least significantly reduced.

In order to make operation especially easy for the user, the lighting device can be designed such that a region of the lens in which the predetermined shape is visible when the primary light source is switched off and the secondary light source is switched on is designed to be touch-sensitive. In this way intuitive operation becomes possible, since the user must touch precisely the region that contains the identification of the lamp. Naturally, it is likewise possible that the entire lens is designed to be touch-sensitive so that the user need not pay attention to which region of the lens he touches. In this case, control takes place, on the one hand, through mechanical contact with the touch-sensitive region, and on the other hand, depending on the design of the sensor system, even through proximity of a body part of the user, for example a finger, to the corresponding region. In the discussion that follows, these two possibilities are not always mentioned separately from one another, so within the scope of the present invention the expression "touch-sensitive" should always be understood to include "proximity-sensitive" as an alternative.

The predetermined shape can be visible in a central region of the lens when the secondary light source is switched on. For this purpose it is useful when the irregularities that form the predetermined pattern are likewise arranged in a central region of the light guiding element. The result is thus a visually attractive appearance of the lamp. Especially when multiple patterns are present, for example in the form of two or more pictograms, it can be useful to display the patterns outside the center of the lens instead of in the middle. The same then applies to the arrangement of the irregularities in the light guiding element. For example, a pictogram for switching on the lamp and a pictogram for switching off the lamp can be provided, or different lighting programs could be linked to different touch-sensitive regions, which are correspondingly labeled with different shapes or pictograms. This could involve, for example, different lighting intensities, simultaneous driving of multiple lamps, or even different light colors.

The light guiding element can be arranged between the light directing element and the lens. No changes whatsoever need be made to existing light directing elements and lenses for this embodiment. Instead, a light guiding element can be placed between the light directing element and the lens without great additional design effort in order to implement the invention. Here, too, the term "between" again refers, in particular, to a direction parallel to the primary direction of propagation of the light emitted by the primary light source. Thus, in other words, in this direction there is a spacing between the light directing element and the light guiding element as well as between the light guiding element and the lens.

The light guiding element can be arranged between the primary light source and an end of the light directing element facing the lens. In other words, the light guiding element then intersects the light directing element. For this purpose, the light directing element can be multi-piece in design, and be divided at least into a part that is arranged between the primary light source and the light guiding element, and a part that is arranged between the light guiding element and the lens. This is possible especially in the case when the light directing element is a reflector. The embodiment discussed can have advantages in terms of overall depth. Furthermore, when viewed from the outside, a visual effect is produced as though a part of the reflector were floating.

The light guiding element can be arranged such that light radiating from the primary light source passes through the light guiding element. For this purpose, the light guiding element can be implemented as a thin film that is essentially perpendicular to a primary direction of propagation of the light emitted by the primary light source. The light guiding element can then also be essentially parallel to the lens. In this case, the light from the primary light source passes through the light guiding element first and then the lens, and from there it arrives in the passenger compartment of the vehicle. The light from the secondary light source is first coupled into the light guiding element and is scattered at the irregularities. The component of the light from the secondary light source that is scattered in the direction of the lens then likewise passes through the lens, and in this way likewise reaches the passenger compartment of the vehicle. The light from the primary light source, in contrast, passes through the light guiding element essentially unaffected.

In order to obtain a compact lamp, it is advantageous if the light guiding element has a thickness of 0.1 mm to 3 mm. The light guiding element is then cost-effective to manufacture, takes little installation space, and has only a minimal effect on the light from the primary light source. Especially thin light guiding elements can have a thickness between 0.1 mm and 1 mm and be implemented, for example, as a film.

For example, the control unit is designed to drive the primary light source as a function of a sensor signal emitted by the touch-sensitive lens. In this design, simply touching the lens or the touch-sensitive area of the lens can bring about a straightforward switching on or off of the lamp. It is likewise possible that additional control commands are triggered, for example through the duration of the touch or through a certain pattern of touches. Thus it is possible that the lamp is designed to be dimmable, for example.

The control unit can be designed such that the secondary light source is switched on and off independently of an operating state of the primary light source. Provision can also be made, however, to switch off the secondary light source as soon as the primary light source is switched on. Accordingly, the secondary light source can be switched on as soon as the primary light source is switched off in order to display the position and function of the lamp to the user at all times.

Advantageously, the lamp according to the invention or the control unit can be designed such that the secondary light source is driven as a function of a usage state of the vehicle. A distinction can be made, for example, between two different states as the usage state, namely "parked" in the sense of a state of nonuse, and "driving" in the sense of a state of use. In the "driving" state, it is not necessary for the vehicle to be in motion. Instead, the "driving" state should be set as soon as the presence of people is detected in the vehicle. This can be accomplished through a monitoring of the doors, through a monitoring of the weight acting on the seats, or in another way.

Further, an intensity of the at least one secondary light source, or a total intensity of the multiple secondary light sources, may be less than 50%, preferably less than 30%, and especially preferably less than 10% of an intensity of the primary light source. It is ensured by this means than an energy-efficient design is available, and also that the switch locating light alone neither dazzles nor bothers the user.

In a cost-effective implementation, the light guiding element can be designed as a light-guiding film. Such a film is economical to manufacture, and can be processed in flexible ways. In order to achieve comfortable lighting of the passenger compartment of the vehicle, the lens can be implemented as a volume scatterer.

The light directing element can be implemented as a reflector or as a collimator. Both options are sufficiently well known from the prior art, and therefore are not discussed further here. Other types of light directing elements are likewise possible, of course.

The irregularities in the light guiding element can be created by laser irradiation, by an ion beam, by mechanical processing of the surface of the light guiding element, or by a suitable design of a mold, in particular an injection mold, used to manufacture the light guiding element. In this regard, any implementation is possible that leads to a scattering of light coupled into the light guiding element in the direction of the lens. In particular, the irregularities or the predetermined shape can be scored into the light guiding element.

Provision can be made that the secondary light source can be designed to emit colored light. Accordingly, the relevant lamp can then be identified by a colored symbol, marking, or pictogram. In an improvement of the invention, provision can be made that the secondary light source is designed to emit light of at least two different colors, wherein the color emitted in each case can be dependent on a control signal. In like manner, two or more secondary light sources can be present, which are arranged on opposite sides of the light guiding element, for example, and emit light of different colors, if applicable. A side-by-side arrangement, which is to say on the same side of the light guiding element, is also possible. The only condition is that the arrangement of the secondary light source permits the light that is emitted in each case to be efficiently coupled into the light guiding element and that the component of the light emitted by the secondary light source that is not scattered at the irregularities does not reach the vehicle's passenger compartment. Hence, only a portion of the light emitted by the secondary light source should reach the vehicle's passenger compartment, which was scattered at the irregularities. In this way, the result is achieved that a clearly delimited image of the shape predetermined by the arrangement of the irregularities is perceived by the user, but not a diffuse illumination of the lighting device even when it is in the switched-off state.

The size or cross-sectional area of the light guiding element can be guided by or correspond to the size or cross-sectional area of the light directing element. It is accordingly possible for the lens to have a larger surface than the light guiding element, since the lens generally has a larger surface than the light directing element.

Further, at least one additional light guiding element and an additional secondary light source may be present so that different predetermined shapes become visible for a user as a function of an operating state of the secondary light source and of the additional secondary light source. As a result, it can be made possible, for example, to indicate to a user that touching the lens triggers different functions depending on additional external parameters.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
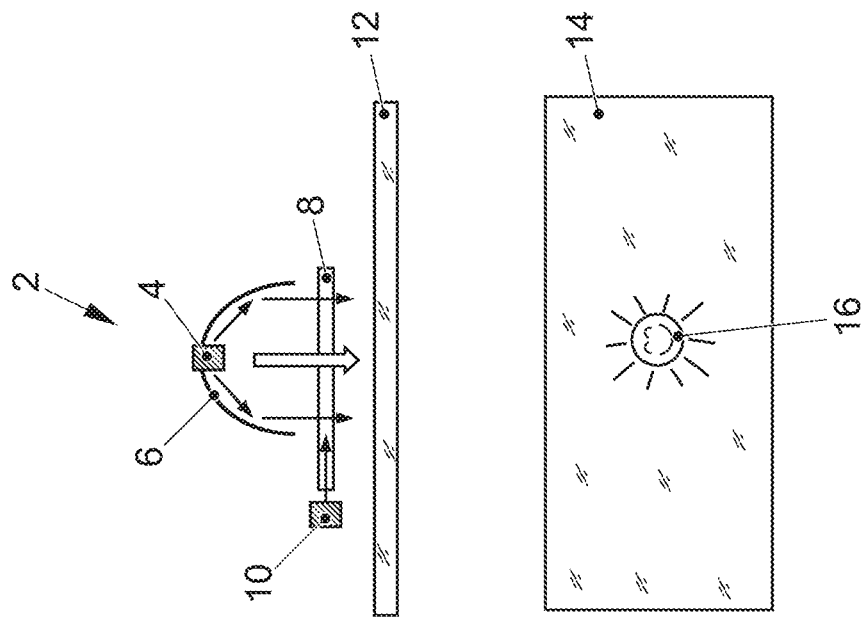
FIG. 1 shows a cross-section of an exemplary embodiment of a lighting device according to the invention.

FIG. 1 shows an exemplary embodiment of a lighting device 2 according to the invention in cross-section. The lighting device 2 includes a primary light source 4, which normally is designed in the form of an LED or multiple LEDs. The light of the LED 4 is emitted in a primary direction of emission, which points downward in the figure. Components of the light that are emitted at an angle to the primary direction of emission by the LED 4 are deflected by the light directing element 6 such that they likewise propagate in the primary direction of emission. The light directing element 6 is implemented as a reflector in the exemplary embodiment shown. The light rays that consequently propagate parallel in the primary direction of emission thus pass through first the light guiding element 8 and then the lens 12, and subsequently enter the passenger compartment of the vehicle. The lens 12 is rectangular in the exemplary embodiment shown. However, it can also be designed in different shapes such as, for example, square, oval, or round.

Arranged between the primary light source 4 and the lens 12 is the light guiding element 8. It is substantially parallel to the lens 12 and passes through the reflector 8 in the exemplary embodiment shown. Light emitted by a secondary light source 10 located outside the light directing element 6 is coupled into the light guiding element 8. In the exemplary embodiment shown, this takes place through a front face of the light guiding element 8. The light from the secondary light source 10 that is coupled into the light guiding element 8 is then scattered at irregularities present in the light guiding element 8, and exits the light guiding element 8 in the direction of the lens 12, which it then passes through together with the light emitted by the primary light source 4, and enters the passenger compartment of the vehicle. The secondary light source 10 can likewise be designed as an LED. Shown here is the case in which both the primary light source 4 and the secondary light source 10 are switched on.

A top view of the lens 12 or the light 14 perceived by a user is shown in the lower area of the figure. The emitted light field 14 has essentially the shape of the lens 12. Also visible is the pictogram 16, which is created by light scattered at the irregularities in the light guide 8 and becomes perceptible to the user. As a rule, the pictogram 16 is visible when the primary light source 4 is switched off. When both the primary light source 4 and the secondary light source 10 are switched on, the light from the primary light source 4 normally eclipses the light from the secondary light source 10, so that the pictogram 16 is not visible. In this respect, a situation that differs from the top part of the figure is shown, in which the light field 14 is dark, and only the pictogram 16 is visible.

Figure 2:
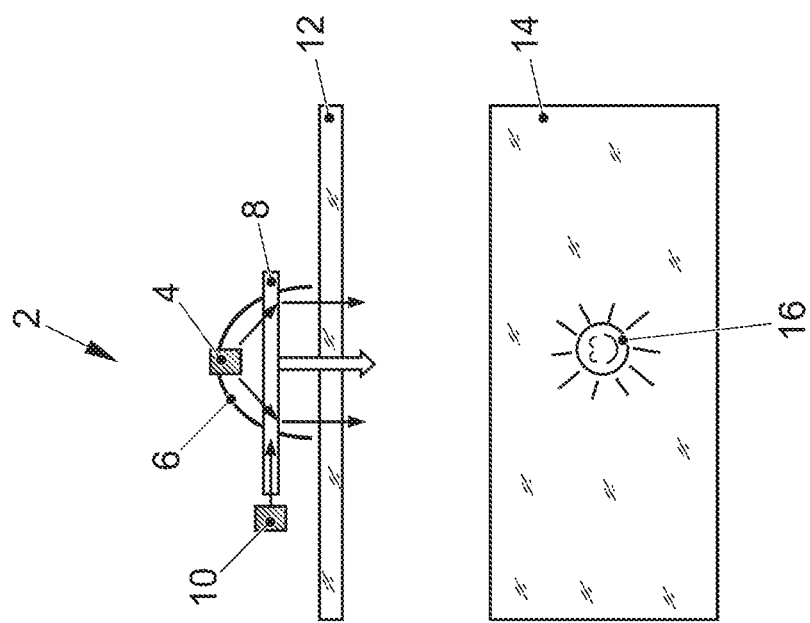
FIG. 2 shows a cross-section of an exemplary embodiment of a lighting device according to the invention.

FIG. 2 shows a second exemplary embodiment of a lighting device according to the invention in cross-section. In contrast to the exemplary embodiment shown in FIG. 1, here the light directing element 6 is arranged so as to be spaced apart from the light guiding element 8. Thus, a certain space is present in the primary direction of propagation between the light directing element 6 and the light guiding element 8. The light directing element 6 is designed as a reflector in the exemplary embodiment shown here as well, but in this case could also be composed of a collimator. The other elements of the lighting element 2 that are shown do not differ from the exemplary embodiment shown in FIG. 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A lighting device for illuminating a passenger compartment of a vehicle, the lighting device comprising:
   a primary light source;
   a light directing element; and
   a lens sealing the lighting device with respect to the passenger compartment of the vehicle;
   a light guiding element arranged between the primary light source and the lens, such that light emitted from the primary light source first passes through the light guiding element before passing through the lens, the light guiding element having irregularities that are arranged in a predetermined shape; and
   a secondary light source arranged such that light emitted by the secondary light source is coupled into the light guiding element,
   wherein the lens is touch-sensitive and/or proximity-sensitive.

2. The lighting device according to claim 1, wherein the light guiding element is essentially parallel to the lens.

3. The lighting device according to claim 1, wherein a region of the lens in which the predetermined shape is visible when the primary light source is switched off and the secondary light source is switched on is touch-sensitive and/or proximity-sensitive.

4. The lighting device according to claim 1, wherein the light guiding element is arranged between the light directing element and the lens.

5. The lighting device according to claim 1, wherein the light guiding element is arranged between the primary light source and an end of the light directing element facing the lens.

6. The lighting device according to claim 1, wherein the light guiding element has a thickness between 0.1 mm and 3 mm.

7. The lighting device according to claim 1, wherein the light guiding element is a light-guiding film.

8. The lighting device according to claim 1, wherein the secondary light source emits light of at least two different colors, and the color emitted in each case is dependent on a control signal.

9. The lighting device according to claim 1, further comprising at least one additional light guiding element and at least one additional secondary light source so that different predetermined shapes become visible for a user as a function of an operating state of the secondary light source and of the additional secondary light source.

10. A motor vehicle comprising a lighting device according to claim 1.

11. The lighting device according to claim 1, wherein all light emitted from the primary light source first passes through the light guiding element before passing through the lens.

12. The lighting device according to claim 1, wherein the light guiding element is discrete from and spaced apart from the lens.

13. The lighting device according to claim 1, wherein the light guiding element extends through the light directing element.

14. The lighting device according to claim 1, wherein the light directing element is a reflector that reflects the light emitted from the primary light source towards the light guiding element.

15. The lighting device according to claim 1, wherein a primary light emission direction of the secondary light source is perpendicular to a primary light emission direction of the primary light source, such that any light emitted from the secondary light source that does not strike the irregularities does not pass through the lens.

* * * * *